United States Patent
Goto et al.

(10) Patent No.: US 8,145,425 B2
(45) Date of Patent: Mar. 27, 2012

(54) NAVIGATION DEVICE AND NAVIGATION METHOD

(75) Inventors: Seiji Goto, Saitama (JP); Takuya Tsukada, Saitama (JP)

(73) Assignee: Pioneer Corporation, Tokyo (JP)

( * ) Notice: Subject to any disclaimer, the term of this patent is extended or adjusted under 35 U.S.C. 154(b) by 470 days.

(21) Appl. No.: 12/518,224

(22) PCT Filed: Dec. 8, 2006

(86) PCT No.: PCT/JP2006/324582
§ 371 (c)(1),
(2), (4) Date: Jun. 8, 2009

(87) PCT Pub. No.: WO2008/072293
PCT Pub. Date: Jun. 19, 2008

(65) Prior Publication Data
US 2010/0094537 A1   Apr. 15, 2010

(51) Int. Cl.
*G01C 21/34* (2006.01)
(52) U.S. Cl. .................................. 701/416; 701/410
(58) Field of Classification Search .............. 701/201, 701/209, 207, 210; 340/995.1, 995.19, 995.2
See application file for complete search history.

(56) References Cited

U.S. PATENT DOCUMENTS

| | | | |
|---|---|---|---|
| 4,943,925 A * | 7/1990 | Moroto et al. ................ | 701/211 |
| 5,043,902 A | 8/1991 | Yokoyama et al. | |
| 7,493,214 B2 * | 2/2009 | Jung et al. ..................... | 701/209 |
| 2003/0055558 A1 | 3/2003 | Watanabe et al. | |
| 2007/0129882 A1 * | 6/2007 | Sano et al. .................... | 701/209 |

FOREIGN PATENT DOCUMENTS

| | | |
|---|---|---|
| EP | 0 349 652 A1 | 7/1989 |
| JP | 05-313574 A | 11/1993 |
| JP | 08-054252 A | 2/1996 |
| JP | 09-152352 A | 6/1997 |
| JP | 2003-075185 A | 3/2003 |
| JP | 2003-083759 A | 3/2003 |
| JP | 2003-269974 A | 9/2003 |
| JP | 2004-061356 A | 2/2004 |
| JP | 2004-245676 A | 9/2004 |
| WO | WO 89/06342 A1 | 7/1989 |
| WO | WO 2006/070785 A1 | 7/2006 |

\* cited by examiner

*Primary Examiner* — Thomas Black
*Assistant Examiner* — Marthe Marc-Coleman
(74) *Attorney, Agent, or Firm* — Arent Fox LLP

(57) ABSTRACT

The present invention is to provide a navigation device having a function of starting a route re-searching early by predicting a route change of a vehicle from a recommended route.

A navigation device is formed such that when guiding a vehicle by virtue of a recommended approaching route and a recommended exit route both connected to a branching point, and once the vehicle traveling from the recommended approaching route and heading for the branching point is about to deviate from the recommended exit route, said navigation device starts a route re-searching for finding a new recommended route going through other route. The navigation device detects that a turning angle θx of the vehicle is about to be in a direction within an angle range not including an angle formed between the direction θa of the recommended approaching route and the direction θb of the recommended exit route, and starts a route re-searching to find a new recommended route going through other route existing within an angle range excluding an angle formed between the directions θa and θb.

6 Claims, 10 Drawing Sheets

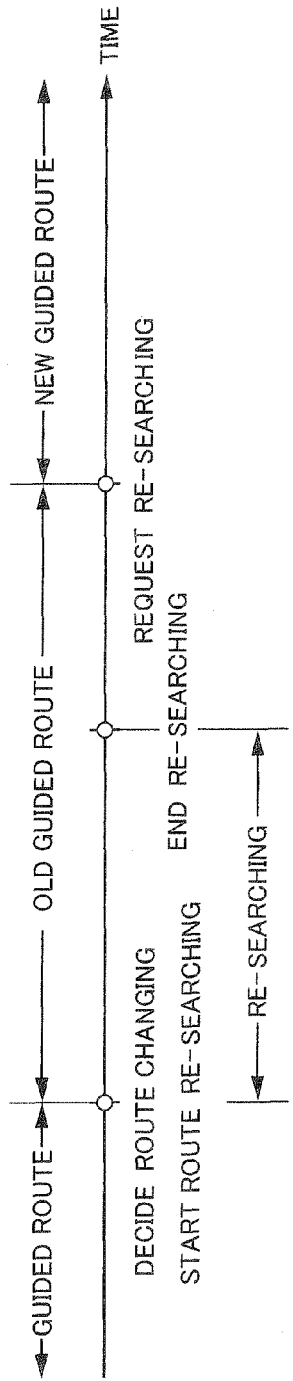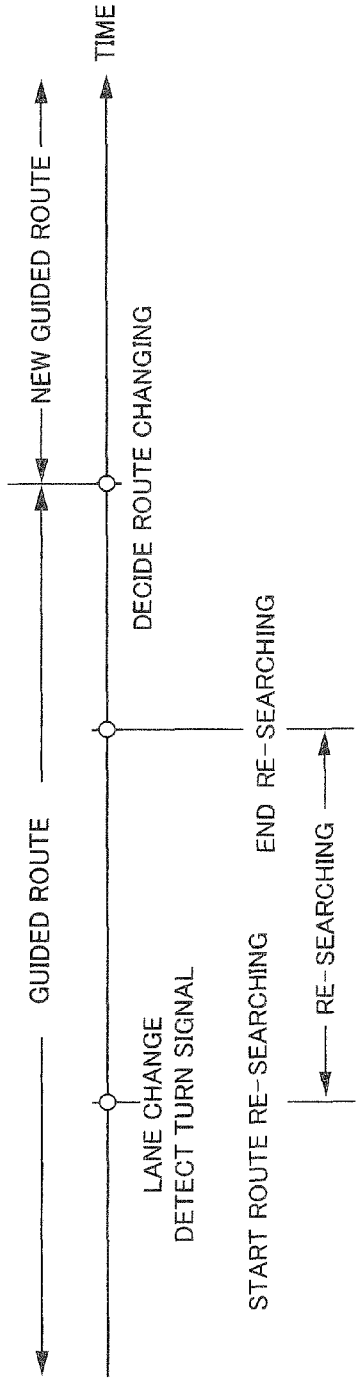

NAVIGATION DEVICE AND NAVIGATION METHOD

CROSS-REFERENCE TO RELATED APPLICATION

This application is a National Stage entry of International Application No. PCT/JP2006/324582, filed Dec. 8, 2006, the disclosure of the prior application is hereby incorporated in its entirety by reference.

TECHNICAL FIELD

The present invention relates to a navigation device having a route re-searching function, and to a navigation method.

BACKGROUND ART

A traditional vehicle navigation device has a route re-searching function (automatic re-routing function), so formed that when the vehicle is guided by searching a recommended route to a destination specified by a user and then out of the recommended route to change the route, the re-searching function automatically starts a re-searching to find a new recommended route so as to guide the vehicle to a destination through a changed route (see patent documents 1 and 2).

In patent document 1, when the navigation device detects a change of the route of the vehicle from the recommended route, a new recommended route is searched again and stored in a storage device. When a user instructs to start the route re-searching, a new recommended route stored in the storage device is displayed so as to guide a vehicle.

In patent document 2, when a vehicle traveling on a recommended route changes a lane before a branching point (for example, an intersection) and then travels for a specified time or longer on the changed lane, it will be determined that the vehicle is going to change its route from the recommended route, and the route re-searching is thus started. After the route change from the recommended route is confirmed, the new recommended route is displayed to guide the vehicle.

With regard to the route re-searching function disclosed in patent document 2, when a turning signal of the vehicle has been detected before the branching point for a specified time or longer, the route re-searching function will determine that the vehicle is going to turn right or left to change its route from the recommended route, thereby starting the route re-searching. After confirming that a route has been changed from the recommended route, the device may display a new recommended route searched beforehand, so as to guide the vehicle.

Patent Document 1: Japanese Unexamined Patent Application Publication No. H09-152352
Patent Document 2: Japanese Unexamined Patent Application Publication No. 2004-61356

DISCLOSURE OF THE INVENTION

Problems to be Solved by the Invention

As shown in a time chart of FIG. 1(a), after confirming that the vehicle has changed its route from the recommended one, the navigation device of patent document 1 will start a route re-searching, and prepare a new recommended route in a time period before the user instructs to start the route re-searching. However, the old recommended route will continue to be displayed until the user instructs to start the route re-searching and a new recommended route will not be displayed until the user recognizes the old recommended route himself and instructs to re-search a route, thus causing an inconvenience to the user.

The navigation device of patent document 2, as shown in a time chart of FIG. 1(b), detects a lane change or a turn signal of a vehicle and then starts a route re-searching before confirming a route change of the vehicle from a recommended one. Then, after confirming that the vehicle has changed its route from the recommended one, a re-searched new recommended route is displayed so to effect a seamless guidance.

However, in patent document 2, the function of starting a route re-searching depends on a road with a lane changing path on it. On a road without such a lane changing path, it will be difficult to determine whether a vehicle is about to change its route from a recommended one, thus making it difficult to perform an effective route re-searching.

Moreover, though a route re-searching is started upon detecting a turning signal, since the turn signal is dealt only inside the direction indicator of the vehicle, such a turn signal is not output to other electric devices such as a navigation device. Therefore, it is impossible for the navigation device to start a route re-searching based on the turn signal.

The present invention is provided to solve the above-mentioned problems. An object of the present invention is to provide a navigation device and a navigation method, with the navigation device having a novel function of starting a route re-searching early by predicting a route change of a vehicle from a recommended route.

Means of Solving the Problems

An invention recited in claim 1 is a navigation device formed such that when guiding a vehicle by virtue of a recommended approaching route and a recommended exit route both connected to a branching point, and once the vehicle traveling from the recommended approaching route and heading for the branching point is about to deviate from the recommended exit route, the navigation device starts a route re-searching for finding a new recommended route going through other route. This navigation device comprises route change determination device for detecting that a turning angle of the vehicle is about to be in a direction within an angle range not including an angle formed between the direction of the recommended approaching route and the direction of the recommended exit route, thereby starting the route re-searching.

An invention recited in claim 2 is also a navigation device formed such that when guiding a vehicle by virtue of a recommended approaching route and a recommended exit route both connected to a branching point, and once the vehicle traveling from the recommended approaching route and heading for the branching point is about to deviate from the recommended exit route, the navigation device starts a route re-searching for finding a new recommended route going through other route. This navigation device comprises route change determination device for detecting that a turning angle of the vehicle is within an angle range not including a predetermined threshold angle range having the direction of the recommended approaching route as a reference, is about to be in a direction exceeding a direction of the recommended exit route from a direction of the recommended approaching route, or a direction opposite to the direction of the recommended exit route, thereby starting the route re-searching.

An invention recited in claim 5 is also a navigation device formed such that when guiding a vehicle by virtue of a recommended approaching route and a recommended exit route both connected to a branching point, and once the vehicle traveling from the recommended approaching route and heading for the branching point is about to deviate from the recommended exit route, the navigation device starts a route re-searching for finding a new recommended route going through other route. This navigation device comprises route change determination device which compares an actual distance extending from the branching point to a vehicle position, with a required distance extending from the branching point to the vehicle position, the required distance being necessary for the vehicle to enter the branching point at a speed of the vehicle traveling on the recommended approaching route and move to the recommended exit route through the branching point. When the actual distance is shorter than the required distance, the navigation device starts the route re-searching.

BRIEF DESCRIPTION OF THE DRAWINGS

FIG. 1 provides explanatory views for explaining route re-searching functions of a conventional navigation device.

BEST MODE FOR CARRYING OUT THE INVENTION

Figure 2:
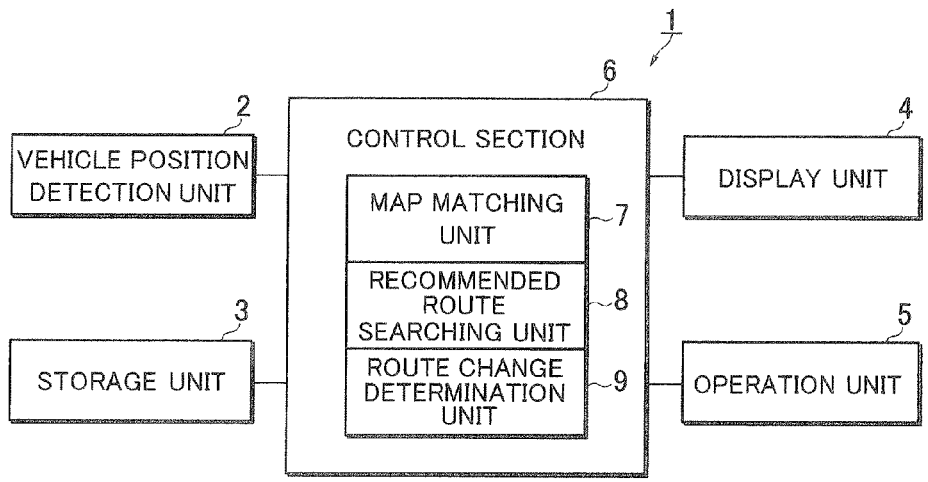
FIG. 2(a) is a bock diagram showing a constitution of a navigation device of a preferred embodiment.
FIG. 2(b) is an explanatory view explaining entities of road data.
Figure 2:
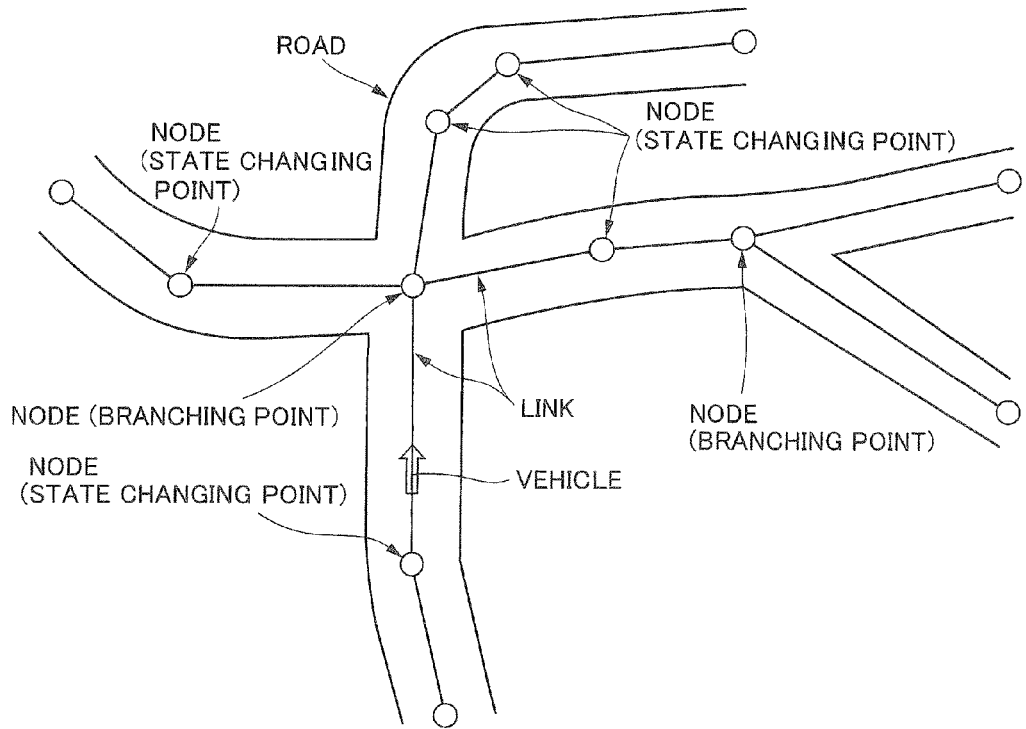

A preferred embodiment of the present invention will be set forth in detail with reference to FIGS. 2 through 5. First, entities of road data used in a route searching and a route re-searching by the navigation device of the present embodiment will be explained using FIG. 2(b).

The road data comprise: as main entities (basic data factors), links connected by state changing points where the shape or direction of road in a map changes, and by a branching points (such as intersections); and nodes indicating coordinates of both ends of each link. At each state changing point, two links are connected by the same node. At each branching point (for example, an intersection), three or more links are connected by the same node. Roads are expressed by the coordinate rows of connected links. Therefore, a state changing point is a node connecting two links, while a branching point is a node connecting three or more links.

In the present embodiment, the navigation device finds a recommended route to guide a vehicle to a destination using the road data stored in a storage unit 3 shown in FIG. 2(a).

As shown in FIG. 2(a), the navigation device 1 of the present embodiment comprises: a vehicle position detection unit 2, a storage unit 3, a display unit 4, an operation unit 5, and a control unit 6. The control unit 6 comprises: a map matching unit 7, a recommended route searching unit 8, and a route change determination unit 9.

The vehicle position detection unit 2 detects a vehicle position or the like by combining GPS (Global Positioning System) navigation with a self-support navigation, while a detection result is supplied to the control unit 6. Namely, the vehicle is positioned by the GPS navigation method using GPS and surveyed based on a turning angle θx of the vehicle, a vehicle speed Vx or the like, all measured by censors such as a gyro censer and a speed censor. Then, the vehicle positions measured by the GPS navigation and the self-support navigation are combined to perform a predetermined supplementary processing. In this way, a more accurate vehicle position Ps can be detected to provide the control unit 6 with detected data regarding the behavior of the vehicle (thereafter, referred to as "the behavior data") such as vehicle position Ps, a turning angle θx, and a vehicle speed Vx.

The storage unit 3 includes a database storing spatiotemporal data (SI: Spatial Information) such as the above-mentioned road data and map data, and serves as an operating area for the control unit 6, the map matching unit 7, the recommended route searching unit 8, and the route change determination unit 9 in performing the below-described processing.

The display unit 4 displays not only a map image based on the map data stored in the storage unit 3, but also a recommended route searched or re-searched by the recommended route searching unit 8 and a vehicle position Px processed by the map matching unit 7 in accordance with the road on the map image, thereby guiding a vehicle to a destination.

The operation unit 5 is provided for a user to give instruction for finding a route extending from the present position to a desired (specified) destination.

The control unit 6 has a micro processor (MPU) and a digital signal processor (DSP) which intensively control the operation of the navigation device 1. The map matching unit 7, the recommended route searching unit 8 and the route change determination unit 9 are realized by executing specified programs by MPU and DSP. Namely, the map matching unit 7, the recommended route searching unit 8, and the route change determination unit 9 are software.

The map matching unit 7 converts the behavior data such as the vehicle position Ps, the turning angle θx, and the vehicle speed Vx detected by the vehicle position detection unit 2 into a traveling path (such as the present position of the vehicle, the direction of the traveling vehicle). By finding the road data in the specified range (area) on the map including the traveling path as proposed data from the road data stored in the storage unit 3 and by comparing a driving path to nodes and links of the recommended road data, the most recommendable road data including nodes and links suitable for the traveling path is determined. Then, the vehicle position Ps is moved (for correction) to the node and link sides of the most recommendable road data, so as to be adjusted to the road on the map. The adjusted vehicle position Px is displayed in the display unit 4.

In other words, the map matching unit 7 converts the vehicle position Ps detected by the vehicle position detection unit 1 into the vehicle position Px adjusted to the road on the map image, so as to prevent the vehicle from being displayed out of the map image.

When a desired destination is input by a user through the operation unit 5, the recommended route searching unit 8 finds a recommended route from the present vehicle position (vehicle position Px processed in the above-mentioned map matching) to the destination using the road data stored in the storage unit 3, and displays the recommended route in the display unit 4. The recommended route searching unit 8 automatically starts the route searching which is the same as the previous route searching, based on the result of the route change determination provided by the route change determination unit 9. The new recommended route to the destination, obtained by route re-searching, is displayed in the display unit 4.

The route change determination unit 9 operates to determine whether the vehicle traveling along the recommended route is about to change its route to other route than the recommended route at the branching point G. According to the result of the route change determination, the route change determination unit 9 causes the recommended route searching unit 8 to starts a route re-searching. The details of functions of the route change determination unit 9 will be explained with reference to a flow chart shown in FIG. 3.

The functions and operations of the navigation device 1 will be explained with reference to the flow chart of FIG. 3 and diagrams of FIGS. 4(*a*) and (*b*). However, the following explanation will mainly describe the functions and operations of the navigation device 1 under a condition where the vehicle traveling along the recommended route searched or re-searched by the recommended route searching unit 8 deviates from the recommended route to other route at the branching point G.

Figure 3:
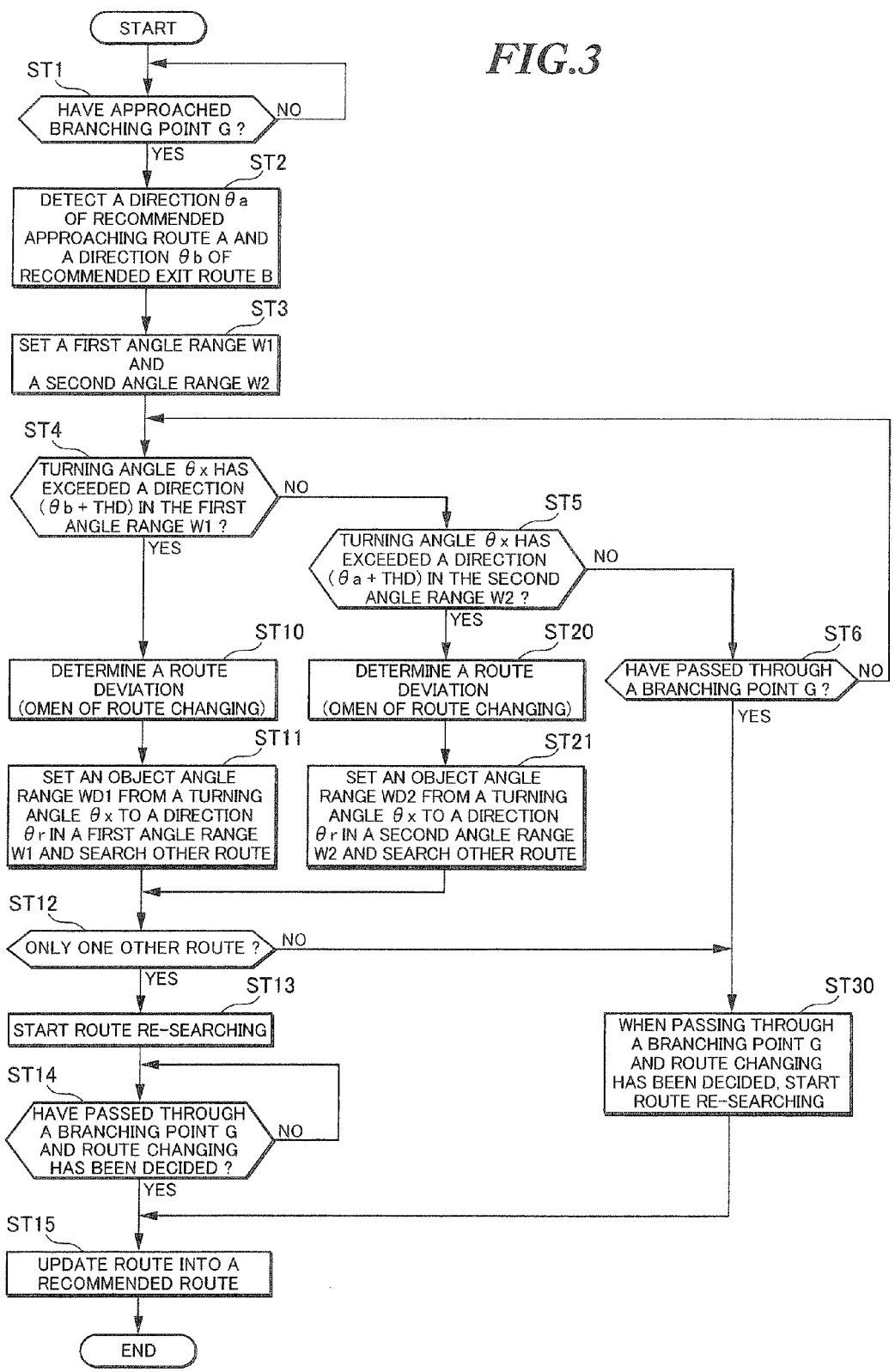
FIG. 3 is a flow chart explaining functions and operations of the navigation device shown in FIG. 2(a).

FIG. 3 is a flow chart showing the processing of the route change determination unit 9. What are input to the route change determination unit 9 are the recommended route data found by the recommended route searching unit 8, the turning angle θx detected by the vehicle position detection unit 2, and the vehicle position Px generated by the map matching unit 7.

At step ST1, the route change determination unit 9 compares the vehicle position Px with the recommended route and determines whether the vehicle is approaching the branching point G. By comparing the vehicle position Px to nodes and links serving as important factors of the recommended route, it is determined whether the vehicle has entered an area separated at a predetermined distance from the node of the branching point G positioned before the vehicle position Px (thereafter, "branching area"), with nodes of state changing points being excluded and nodes of branching points serving as determination objects.

As shown in FIG. 2(*b*), since the node of each state changing point connects two links rather than three or more links, they are excluded from determination objects as nodes not having any possibility of route changing, while a node connecting more than three links will be determined to be the node having the possibility of route changing, and thus deemed as determination object.

Figure 4:
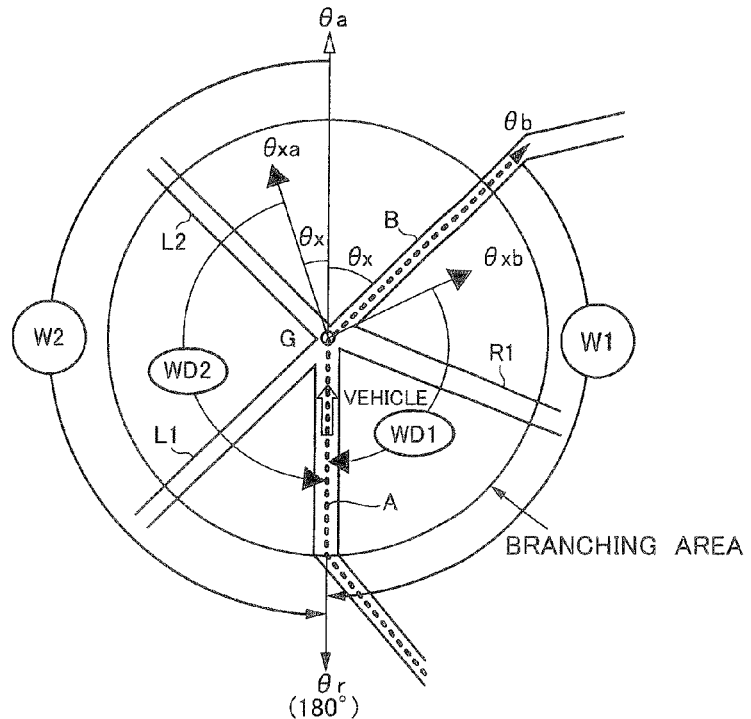
FIG. 4 provides explanatory views explaining the functions and operations of the navigation device shown in FIG. 2(a).
Figure 4:
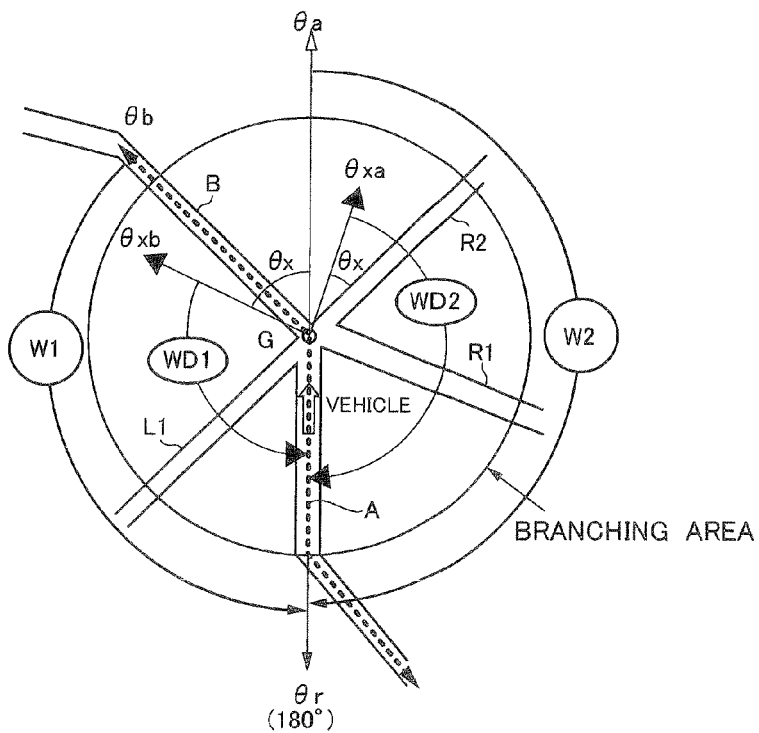

When the recommended routes A and B are displayed as a dot line on the map image of the display unit 4 as schematically shown in FIG. 4(*a*), or when the recommended routes A and B are displayed as a dot line in the display unit 4 as schematically shown in FIG. 4(*b*), if a vehicle traveling along the recommended route A enters the branching area of the branching point G, the vehicle will be determined to be approaching the branching point G (step ST1: "yes").

Even though a recommended route to the branching area G has many curves due to the excluding of the nodes of the state changing points from the determination objects, the vehicle is determined to be traveling on a road along the recommended route and determined to be "No" until the vehicle enters the branching area.

Branching areas are calculated with each containing one branching point G and set within a range shorter than a vehicle traveling link connected to the node of the branching point G (for example, in FIGS. 4(*a*) and (*b*), a link of the recommended route A connected to the branching point G), but larger than the branching point G (area of the intersection obtained from the map data). Namely, by setting the branching area to at least the area of the branching point G, it is possible to highly accurately determine that the vehicle has approached the branching point G.

FIG. 4(*a*) shows a pattern that the recommended route B ahead of the branching point G (thereafter, "recommended exit route") is to the right side of a recommended route on which the vehicle approaches the branching point G (thereafter, "recommended approaching route"). FIG. 4(*b*) shows a pattern that the recommended exit route B is to the left side of the recommended route A.

Once the route change determination unit 9 determines, in the above-mentioned step ST1, that the vehicle is approaching the branching point G, the process proceeds to step ST2 where the direction θa of the recommended approaching route A and the direction θb of the recommended exit route are detected based on the respective links. In FIG. 4(*a*), the direction θb of the recommended exit route B to the right side of the recommended approach route A is detected. In FIG. 4(*b*), the direction θb of the recommended exit route B to the left side of the direction θa of the recommended approaching route A is detected.

At step ST3, the route change determination unit 9 takes the direction θb of the recommended exit route B as a standard direction, sets a narrow angle range (180° and under) from the direction θb of the recommended exit route B to 180° as a first angle range W1, and another angle range (an angle range of 180°) from the direction of θa to 180° excluding the direction θb of the recommended exit route B as a second angle range W2.

Namely, in FIG. 4(*a*) the first angle range W1 is set as the range from the direction 9*b* of the recommended exit route B pointing to the right of the direction θa of the recommended approaching route A, clockwise to the direction θr (180°). Meanwhile, the second angle range W2 is set as the angle range from the direction θa of the recommended approaching route A counterclockwise to the direction θr.

In FIG. 4(*b*), the first angle range W1 is set as the range from the direction θb of the recommended exit route B pointing to the left of the direction θa of the recommended approaching route A, counterclockwise to the direction θr (180°). Meanwhile, the second angle range W2 is set as the angle range from the direction θa of the recommended approaching route A clockwise to the direction θr.

At step ST4, the route change determination unit 9 determines whether the turning angle θx has exceeded the direction (θb+THD) in the first angle range W1. Here, the direction THD is the minimum angle (a threshold value) capable of detecting the turning angle of the vehicle.

Then, as shown in FIG. 4(*a*), when the turning angle θx becomes the direction θxb and the direction θxb has developed from the direction θa and clockwise exceeded the direction (θb+THD), the turning angle is determined "exceeded".

As shown in FIG. 4(*b*), when the turning angle θx becomes the direction θxb and the direction θxb has developed from the direction θa and counterclockwise exceeded the direction (θb+THD), the turning angle is determined "exceeded".

Namely, at step ST4, it is determined whether the vehicle has turned towards the recommended exit route B and the direction θx has become the direction θxb exceeding the direction (θb+THD). When the turning angle θx is determined to be exceeding the direction (θb+THD) in the first angle range W1 ("yes"), the process proceeds to step ST10 where it is determined that there is an omen of vehicle's changing its route from the recommended route. On the other hand, if it is determined that the turning angle has not exceeded the aforementioned angle ("No"), the process proceeds to step ST5.

At step ST5, the route change determination unit 9 determines whether the turning angle θx of the vehicle has exceeded the direction (θa+THD) in the second angle range W2. Then, as shown in FIG. 4($a$), when the turning angle θx has become the direction θxa which has developed from the direction θa and exceeded counterclockwise the direction (θa+THD), the turning angle is determined "exceeded".

As shown in FIG. 4($b$), the turning angle θx becomes a direction θxa. When the direction θxa has clockwise exceeded the direction (θa+THD) from the direction θa, the turning angle is determined "exceeded".

At step ST5, it is determined whether the vehicle has turned to the opposite direction of the recommended exit route B. When the turning angle θx is determined to have exceeded the direction (θa+THD) in the second angle range W2 ("Yes"), the process proceeds to step ST20 where it is determined that the vehicle has an omen of deviating from the recommended route so as to change its route. On the other hand, if it is determined that the angle θx has not exceeded the direction (θa+THD) ("No"), the process proceeds to step ST6.

At step ST6, the route change determination unit 9 compares the vehicle position Px with the coordinate of the node of the branching point G, then determines whether the vehicle has passed through the branching point G. When the vehicle is determined to have passed through the branching point G ("yes"), the process proceeds to step ST30. If not ("No"), the process proceeds to step ST4.

Next, description is given to explain an operation which is performed when at step ST10 the route change determination unit 9 has determined an omen of changing route. Namely, at first, at step 10 the route change determination unit 9 provides the recommended route searching unit 8 with the result of the route change determination. Next, at step ST11, the object angle range WD1 is set to cover an angle range from the present turning angle θx to the direction θr in the first angle range W1. Other routes in the object angle range WD1 are searched in the road data stored in the storage unit 3.

For example, as shown in FIG. 4($a$), when the vehicle turns right and there is only one other route R1 in the object angle range WD1 developing from the turning angle θxb to the direction θr, such an other route R1 is searched. If there are several other routes, these several other routes are searched. On the other hand, if there are no other routes, the searching is finished and the process proceeds to step ST12.

On the other hand, as shown in FIG. 4($b$), when the vehicle turns left and there is one other route L1 in the object angle range WD1 developing from the turning angle θxb to the direction θr, such an other route L1 is searched. If there are several other routes, these several other routes are searched. On the other hand, if there are no other routes, the searching is finished and the process proceeds to step ST12.

At step ST12, the route change determination unit 9, using the result of the above-mentioned searching, determines whether other route is only one. If yes, the process proceeds to step ST13. If other routes are several or none ("No"), the process proceeds to ST30.

Namely, as shown in FIGS. 4($a$) and ($b$), when the vehicle turns right or left and there is only one other route R1 or L1 in the object angle range WD1, the process proceeds to step ST13.

At step ST13, the recommended route searching unit 8 starts the route re-searching to find a new recommended route to guide a vehicle to a destination by going through the above-mentioned single other route, based on the result of the route change determination performed by the route change determination unit 9. In other words, in FIG. 4($a$), the route re-searching is started to find a new recommended route going through other route R1. In FIG. 4($b$) the route re-searching is started to find a new recommended route L1 going through other route L1.

Next, at step ST14, the control unit 6 compares the vehicle position Px to the node of the branching point G to determine whether the route change through the branching point G to other route has been decided. If the route change has been decided, the process proceeds to step ST15, and a new recommended route re-searched by starting the re-searching performed by the recommended route searching unit 8 is updated and displayed on the display unit 4. Then, the process returns to step ST1 to repeat the previous processing.

In this way, after processing at steps ST10 through ST15, before the vehicle goes through the branching point G, the route re-searching is started predicting that the route will be changed to other route existing on the side of the direction θb of the recommended exit route B (in the object angle range WD1). Hence, when the route change is decided, the new recommended route can be promptly displayed so as to guide the vehicle.

Next, description is given to explain a condition where at step ST20 the route change determination unit 9 has determined an omen of changing route. Namely, at first, at step 20 the route change determination unit 9 provides the recommended route searching unit with the result of the route change determination. Next, at step ST21, the object angle range WD2 is set to cover an angle range from the present turning angle θx to the direction θr in the second angle range W2. Other routes in the object angle range WD2 are searched in the road data stored in the storage unit 3.

For example, as shown in FIG. 4($a$), when the vehicle turns to the left of the direction θa of the recommended approaching route A and there are other routes L2 and L1 in the object angle range WD2 developing from the turning angle θxa to the direction θr, the other routes L2 and L1 are searched. However, when no other routes are found, the searching is finished, and the process proceeds to step ST12.

Further, as shown in FIG. 4($b$), when the vehicle turns to the right of the direction θa of the recommended approaching route A and there are other routes R2 and R1 in the object angle range WD2 developing from the turning angle θxa to the direction θr, the other routes R2 and R1 are searched. However, when no other routes are found, the searching is finished, and the process proceeds to step ST12.

At step ST12, it is determined whether there is only one other route, and if there is only one ("Yes"), the process proceeds to step ST13. When there are several other routes or no other route ("No"), the process proceeds to step ST30.

As shown in FIGS. 4($a$) and ($b$), when there are several other routes L1 and L2 or R1 and R2 in the object angle range WD2, the process proceeds to step ST30. On the other hand, even if there are no other routes, the process also proceeds to step ST30. Further, If there is only one other route L1 or R1 in the object angle range WD2, the process proceeds to step ST13.

At step ST13, the recommended route searching unit 8 starts route searching to find a new recommended route so as to guide the vehicle to the destination through the above-mentioned single other route, in accordance with the result of the route change determination sent from the route change determination unit 9. At step ST14, the control unit 6 determines whether the vehicle has passed through the branching point G and decided to change its route to other route. When the route change has been decided, the process proceeds to step ST15, and the new recommended route re-searched by the recommended route searching unit 8 is updated and displayed on the display unit 4. Subsequently, the process proceeds to step ST1 to repeat its previous steps.

In this way, when steps, ST20, ST21, and ST12 though ST15 are executed and the vehicle has not passed through the branching point G, prediction is performed to predict an omen in which the vehicle might change to other route existing on an opposite side away from the direction θb of the recommended exit route B (in the object angle range WD2), followed by starting a route re-searching. As a result, it is possible to show the user a new recommended route and guide the vehicle soon after the route change has been decided.

As mentioned above, when the route change determination unit 9 determines at step ST6 that the vehicle has passed through the branching point G, the process proceeds to step ST30. When it is determined at step ST12 that there are several other routes, the process proceeds to step ST30. At step ST30 the control unit 6 determines whether the vehicle has passed through the branching point G and has decided to change to other route. When the route change is decided, the control unit 6 causes the recommended route searching unit 8 to start the route re-searching. Namely, at step ST30, the route re-searching is started to find the new recommended route going through other route not when the route changing of the vehicle is predicted, but when the route changing has been decided. Then, at step ST15, the new recommended route is updated and displayed in the display unit 4. Subsequently, the process returns to step ST1 to repeat its previous steps.

As explained above, according to the navigation device 1 of the present embodiment, when the vehicle goes into the branching area of the branching point G, the direction θr is set to 180° opposite to the direction θa of the recommended approaching route A; the first angle range W1 is set to the angle range from the direction θb of the recommended exit route to the direction θr; the second angle range W2 is set to the angle range from the direction θa of the recommended approaching route A to the direction θr excluding the direction θb of the recommended exit route B. When the turning angle of the vehicle θx has exceeded the direction θb in the first angle range W1, or the turning angle θx of the vehicle has exceeded the direction θa in the second angle range W2, the route re-searching is started expecting that the vehicle will deviate from its recommended route. Hence, the route re-searching can be promptly started before the vehicle goes through the branching point G.

Namely, in the navigation device 1 of the present embodiment, when the turning angle θx is detected to be in the direction of an angle rage excluding an angle range between the direction θa of the recommended approaching route A and the direction θb of the recommended exit route B, the route re-searching can be restarted promptly before the vehicle goes through the branching point G.

Further, once the route changing has been decided, it is possible to update a vehicle route to a new recommended route obtained by route re-searching. Therefore, it is possible to for the present invention to provide a user with an excellent convenience by guiding the vehicle seamlessly even when the route is changed.

Particularly, since the navigation device 1 of the present embodiment predicts a deviation of a vehicle from a recommended route (an omen of route changing) by detecting the behavior of the vehicle, it is not necessary to determine whether the vehicle is traveling on a particular road having a lane changing path adopted in prior art. Hence, the vehicle can be smoothly guided by starting a route re-searching at an earlier time without depending on the shape of road.

Also, since the navigation device 1 of the present embodiment starts a route re-searching after limiting other routes to only one at step ST12 of the flow chart shown in FIG. 3, it becomes possible to handle a route change of a vehicle without increasing the processing load of the recommended route searching unit 8 formed by CPU or DSP.

However, at step ST10 or ST20, when several other routes are searched, several routes do not have to be limited to only one. At step ST13, the route re-searching may be started among several other routes. At step ST14, when the route changing has been decided, the new recommended route going through the decided other route may be updated and displayed at step ST15 as the most recommendable route.

In this way, when the route re-searching is started among several other routes without processing at step ST12, during a searching process at step ST10 or step ST20, routes are limited to those in the object angle range WD1 or WD2. Therefore, even if the recommended route searching unit 8 has a larger processing loader than an example of limiting other routes to only one, there will no considerably large load increase. For this reason, it is not necessary to limit other routes to only one.

Further, it is also possible to find other routes without limiting them to only one, exclude approach-forbidden roads such as one-way road from the searched other routes, and re-search a new recommended route based on the remaining other routes.

Moreover, at steps ST11, ST21 and ST12, when it is impossible to limit other routes to only one, it is allowed to perform a route re-searching by virtue of step ST30 without starting the route re-searching at step ST13.

For example, as shown in FIG. 5(*a*), when the recommended exit routes B1, B2 and B3 are at sharp curves and almost parallel to other route (1), and when the vehicle has turned to the directions of the recommended exit routes B1, B2 and B3, there is a possibility that the recommended exit routes B1, B2 and B3 can not be distinguished from other route (1). For this reason, it is allowed to perform a route re-searching by virtue of step ST30 without starting the route re-searching at step ST13.

Whether the recommended exit routes B1, B2 and B3 are sharp curves can be determined by comparing angles θ1 and θ2 as shown in FIG. 5(*h*). θ1 is an angle formed between the direction θa of the recommended approaching route of a traveling vehicle and the recommended exit route B1. θ2 is an angle formed between the recommended exit routes B1 and B2. When the angle θ2 is larger than the angle θ1, a curve at this time is determined to be a sharp curve.

As shown in FIG. 5(*b*), when the recommended exit route B is substantially parallel to the other route (1), and when the vehicle has turned to the direction of the recommended exit route B, there is a possibility that the recommended exit route B and other route (1) cannot be distinguished from each other. For this reason, it is allowed to perform a route re-searching by virtue of step ST30 without starting the route re-searching at step ST13.

As shown in FIG. 5(*c*), when, in addition to the recommended exit route B, there are other routes (1) and (2) which are substantially parallel to each other, and when the vehicle has turned to the direction of other route (1) or other route (2), there is a possibility that other routes (1) and (2) cannot be distinguished from each other. For this reason, it is allowed to perform a route re-searching by virtue of step ST30 without starting the route re-searching at step ST13.

Figure 5A:
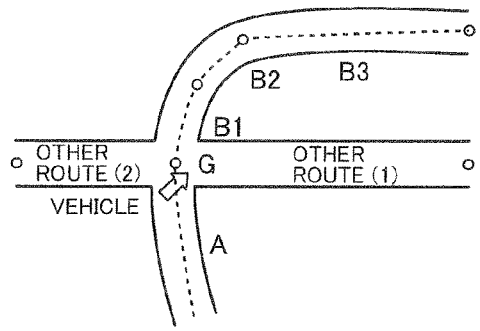
FIG. 5 provides explanatory views further explaining the functions of the navigation device of the preferred embodiment.
Figure 5B:
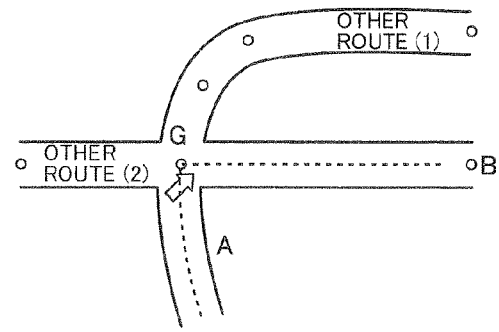
Figure 5C:
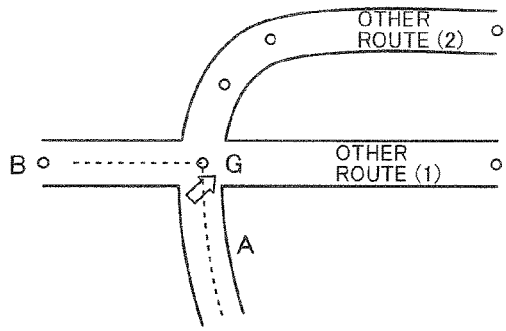
Figure 5D:
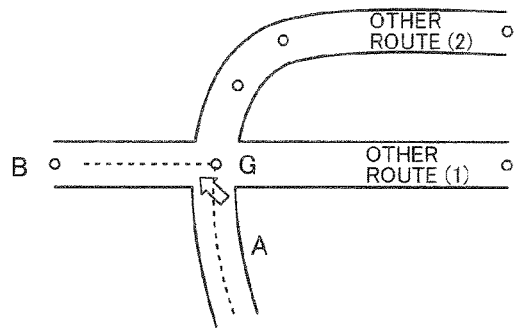

As shown in FIG. 5(d), when, in addition to the recommended exit route B, there are other routes (1) and (2) which are substantially parallel to each other, and when the vehicle has turned to the direction of the recommended exit route B, there is a possibility that other routes (1) and (2) cannot be distinguished from each other. For this reason, it is allowed to perform a route re-searching by virtue of step ST30 without starting the route re-searching at step ST13.

Figure 5E:
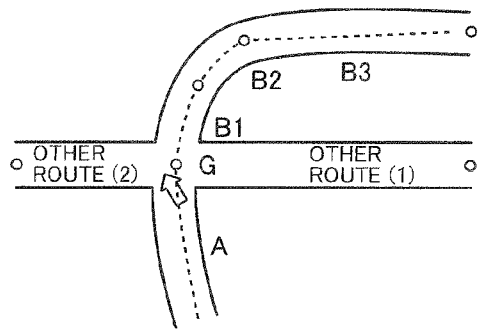

As shown in FIG. 5(e), when the recommended exit routes B (i.e., B1, B2, B3 . . . ) are substantially parallel to other route (1), and when the vehicle has turned to the direction of other route (2) which is not parallel to other route (1), it is possible to find other route (1) excluding the recommended exit routes B (i.e., B1, B2, B3 . . . ), thereby starting the route re-searching at step ST13.

Figure 5F:
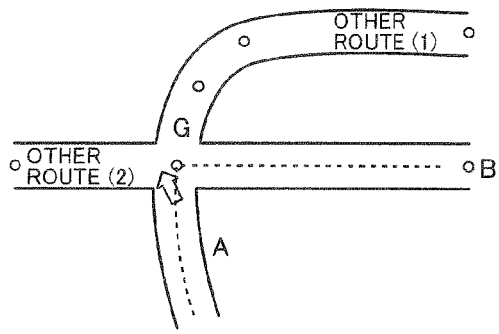
Figure 5H:
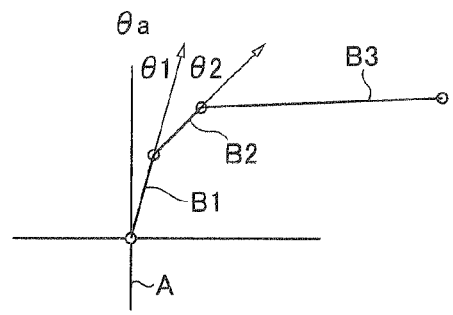

As shown in FIG. 5(f), when there is other route (1) substantially parallel to the recommended exit route B, and when the vehicle has turned to the direction opposite to the recommended exit route B, it is possible to find other route (2), thereby starting the route re-searching at step ST13.

In this way, when it is inevitably impossible to find other route, it is possible to avoid a complex processing by not starting a route re-searching at step ST13, thereby obtaining an effect of reducing the processing load of CPU or DSP.

First Embodiment

Figure 6:
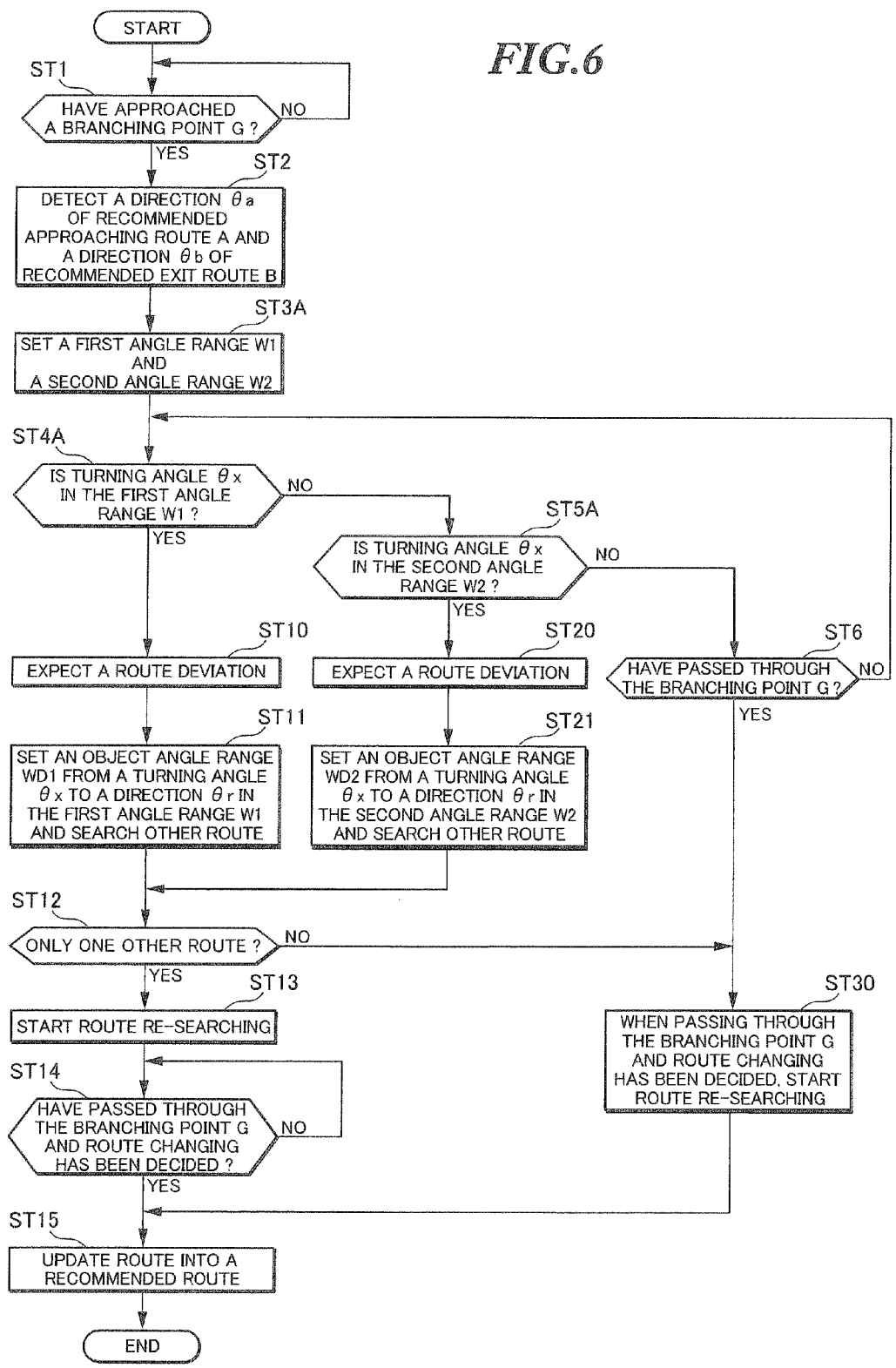
FIG. 6 is a flow chart explaining functions and operations of the navigation device formed according to a first embodiment.

A first embodiment will be explained with reference to FIGS. 6 and 7. In FIG. 6 the same signs are used to refer to the same or corresponding steps in FIG. 3. Also, FIGS. 7(a) and (b) correspond to FIGS. 4(a) and (b) respectively, using same signs to represent the same or corresponding parts.

Since the navigation device of the present embodiment is essentially the same as the structure shown in FIG. 2(a), the explanation thereof is omitted here. However, description will be given to explain functions, operations and route re-searching function of the navigation device of the present embodiment.

The navigation device of the present embodiment performs substantially the same processing as shown in the flow chart of FIG. 3. However, as shown in the flow chart of FIG. 6, the processing at steps ST3A, ST4A and ST5A are different from one another.

As shown in FIG. 6, data of the recommended route searched by the recommended route searching unit 8, data of the turning angle θx constantly detected by the vehicle position determination unit 2, and data of the vehicle position Px generated by the map matching unit 7 are input into the route change determination unit 9. Then, at step ST1 the route change determination unit 9 determines whether the vehicle is approaching the branching point G by comparing the vehicle position Px with the recommended route (refer to FIGS. 7(a) and (b)).

When the route change determination unit 9 determines that the vehicle has approached the branching point G, the process proceeds to step ST2, thus detecting the direction θa of the recommended approaching route A and the direction θb of the recommended exit route based on respective links.

Next, at step ST3A, the route change determination unit 9 sets, as the first angle range W1 and the second angle range W2, an angle range developing from the direction (θa+θth) to 180°, with the direction (θa+θth) being formed by adding a threshold θth to a reference direction θa.

Figure 7A:
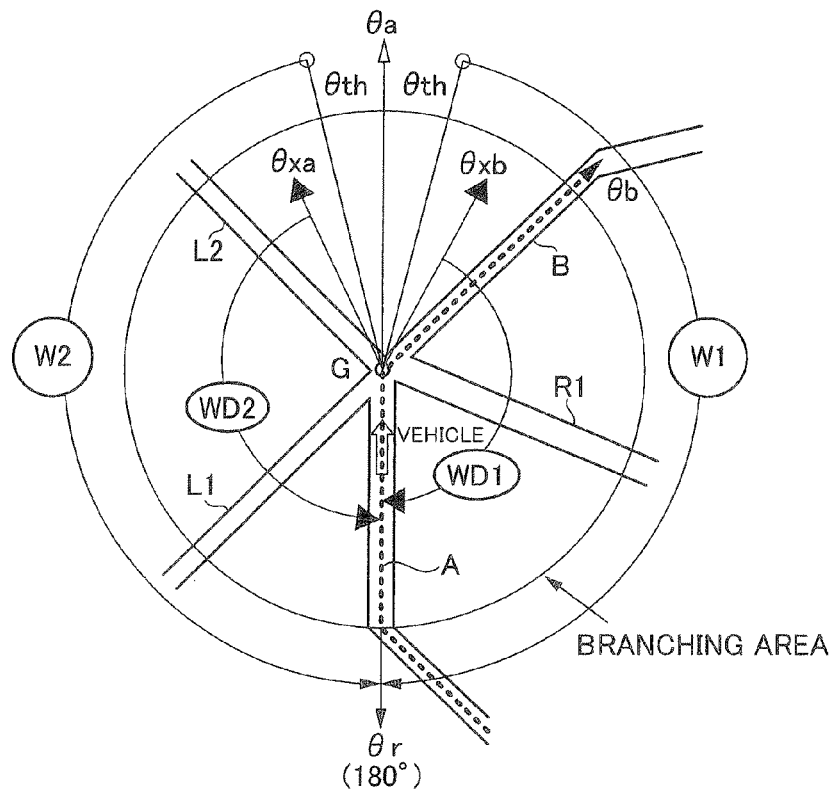
FIG. 7 provides explanatory views further explaining the functions of the navigation device of the first embodiment.
Figure 7B:
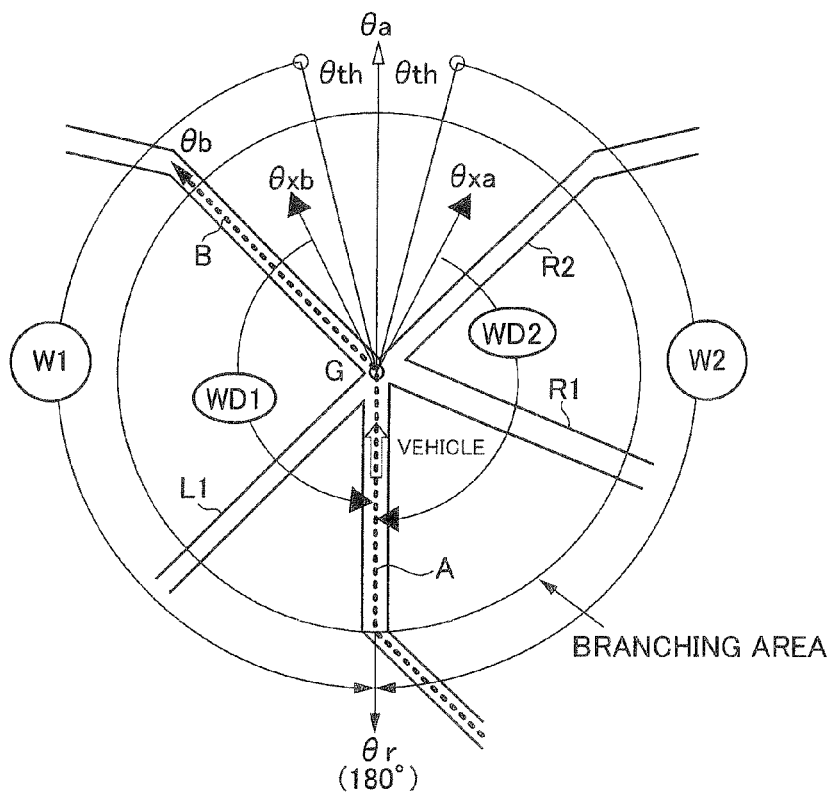

In FIG. 7(a), the first angle range W1 is set to cover an angle range developing clockwise (rightward) from the right direction (θa+θth) to the direction θr (180°), including the direction θb of the recommended exit route B turning right with respect to the direction θa of the recommended approaching route A. The second angle range W2 is set to cover an angle range developing counterclockwise (leftward) from the left direction (θa+θth) to the direction θr (180°). In FIG. 7(b), the first angle range W1 is set to cover an angle range developing counterclockwise (leftward) from the left direction (θa+θth) to the direction θr, including the direction θb of the recommended exit route B turning left with respect to the direction θa of the recommended approaching route A. The second angle range W2 is set to cover an angle range developing clockwise (rightward) from the right direction (θa+θth) to the direction θr.

Next, at step ST4A, the route change determination unit 9 determines whether the turning angle θx of the vehicle is within the first angle range W1 or not. Namely, at step ST4A, it is determined whether the vehicle has turned to the direction of the recommended exit route B and whether the turning angle θx is the direction θxb within the first angle range W1. Then, when the turning angle θx is determined to be within the first angle range W1 ("Yes"), the process proceeds to step ST10, and it is determined that the vehicle might change its route. On the other hand, if the turning angle θx is not within the first angle range W1 ("No"), the process proceeds to step ST5A.

At step ST5A, the route change determination unit 9 determines whether the vehicle turning angle θx is within the second angle range W2. Then, as shown in FIGS. 7(a) and (b), if the turning angle θx is determined to be the direction θxa, and the θxa is determined to be within the second angle range W2, the process proceeds to step ST20 where it is determined that the vehicle might change its route. On the other hand, if the turning angle θx is determined to be out of the second angle range W2 ("No"), the process proceeds to step ST6.

At step ST6, the route change determination unit 9 compares the vehicle position Px with the coordinate of the node of the branching point G and determines whether the vehicle has passed through the branching point G. If the vehicle is determined to have passed through the branching point ("Yes"), the process proceeds to step ST30. If not ("No"), the process returns back to step ST4A to repeat the previous steps.

Next, description will be given to explain an operation where the route change determination unit 9 determines at step ST10 that the vehicle might change its route. First, at step ST10, the route change determination unit 9 provides the recommended route searching unit 8 with the result of the route change determination. Then, at step ST11, the object angle range WD1 is set to cover an angle range developing from the present turning angle θx to the direction θr in the range of the first angle range W1. Further, other routes (excluding the recommended exit route B) in the object angle range WD1 are searched from the road data stored in the storage unit, and the process proceeds to step ST12.

At step ST12, the route change determination unit 9 determines whether the above-mentioned other route are only one. If it is determined that there is only one other route ("Yes"), the process proceeds to step ST13. If there are several other routes or there is no other route "No", the process proceeds to step ST30.

Namely, as shown in FIGS. 7(a) and (b), if the vehicle turns to the right or left of the direction θa of the recommended approaching route A and as a result there is only on other route R1 or L1 in the object angle range WD1, the process proceeds to step ST13.

Next, at step ST13, the recommended route searching unit 8 starts the route re-searching to find a new recommended route to guide the vehicle to the destination through the above-mentioned single one other route. Namely, in FIG. 7(a), the route researching is started to find a new recommended route going through the single one other route R1. In FIG. 7(b), the route researching is started to find a new recommended route going through the single one other route L1.

Next, at step ST14, the control unit 6 compares the vehicle position Px with the node of the branching point G to determine whether the vehicle has passed through the branching point G and the route changing has been decided. If it is determined that the route changing has been decided, the process proceeds to step ST15 to cause the display unit 4 to update and display the new recommended route re-searched by the recommended route searching unit 8. Then, the process returns back to step ST1 to repeat the previous steps.

Next, description will be given to explain an example in which the route change determination unit 9 has determined at step ST20 that the vehicle might change its route. At first, the route change determination unit 9 at step 20 provides the recommended route searching unit 8 with the result of the route change determination. Next, at the step ST21, an object angle range WD2 is set to cover an angle range developing from the present turning angle θx to the direction θr in the second angle range W2. Then, other routes in the object angle range WD2 are searched in the road data stored in the storage unit 3.

At step ST12, it is investigated whether there is only one other route. If yes (determined to be "Yes"), the process proceeds to step ST13. If there are several other routes or there is no other route, it is determined to be "No" and the process proceeds to step ST30.

Then, at step ST13, the recommended route searching unit 8 starts the route searching to find a new recommended route to guide the vehicle to the destination through the above-mentioned single other route, based on the route change determination result fed from the route change determination unit 9. Subsequently, at step ST14, the control unit 6 determines whether the vehicle has passed through the branching point G and route changing has been decided. If it is determined that the route changing has been decided, the process proceeds to step ST15 to cause the display unit 4 to update and display the new recommended route re-searched by the recommended route searching unit 8. Afterwards, the process returns back to step ST1 to repeat the previous steps.

As discussed above, when the route change determination unit 9 determines at the step ST6 that the vehicle has passed through the branching point G, the process proceeds to step ST30. If it is determined at step ST12 that other route is not only one, the process proceeds to step ST30. At this time, the control unit 6 determines whether the vehicle has passed through the branching point G and the route changing has been decided. If it is determined at step ST30 that the route changing has been decided, the recommended route searching unit 8 is caused to perform the route re-searching. Namely, what is executed at step ST30 is not to predict an omen of vehicle route changing so as to perform a route re-searching, but to re-search a new recommended route going through other route at the time the route changing has been decided. Subsequently, the process proceeds to step ST15 to cause the display unit 4 to update and display the new recommended route. Then, the process returns back to step ST1 to repeat the previous steps.

As explained above, according to the navigation device of the present embodiment, when the vehicle enters the branching area of the branching point G, a direction θr is set to 180° opposite to the direction θa of the recommended approaching route A. Meanwhile, the first angle range W1 is set to cover an angle range developing from the direction (θa+θth) to the direction θr including the direction θb of the recommended exit route B; the second angle range W2 is set to cover an angle range developing from the direction (θa+θth) to the direction θr excluding the direction θb of the recommended exit route B. When a turning angle θx is within the first angle range W1 or the second angle range W2, it is determined that there is a deviation from the recommended route (an omen of route changing) and a route re-searching is started, thereby rendering it possible to start an earlier route re-searching before the vehicle passes through the branching point G.

Namely, when it is detected that the vehicle turning angle θx is within an angle range having the direction θa of the recommended approaching route A as a reference and excluding an angle range of a threshold value θth, and that the turning angle is an angle developing from the direction θa of the recommended approaching route A and exceeding the direction θb of the recommended exit route B, or an angle opposite to the direction θb of the recommended exit route B, a route-researching is started, thereby rendering it possible to start a route re-searching at an earliest time.

Once the route changing is decided, it is possible to update an old route into a new recommended route re-searched. Therefore, the present invention can provide a user with an excellent convenience by ensuring a seamless guiding even when the route is changed.

Particularly, with the navigation device 1 of the present embodiment, since it is possible to detect the behavior of a vehicle and predicts a deviation (an omen of route changing) from the recommended route of the vehicle, it is not necessary to determine whether the vehicle is traveling on a special road having a lane changing path as equipped in prior art. Therefore, the navigation device can guide seamlessly by starting the route re-searching early without depending on the shape of a road or the like.

Further, with the navigation device of the present embodiment, at step ST12 of the flow chart shown in FIG. 6, since route re-searching is started after other routes are limited to only one, it is possible to handle a vehicle route change without increasing a processing load of the recommended route searching unit 8 formed of the CPU or DSP. However, similar to the preferred embodiment, the navigation device of the present embodiment does not have to necessarily require that other routes be limited to only one. Further, it is also possible to search other routes without limiting them to only one route, exclude approach-forbidden road such as one-way road from the searched other routes, thereby re-searching a new recommended route based on the remaining other routes.

Second Embodiment

Figure 8A:
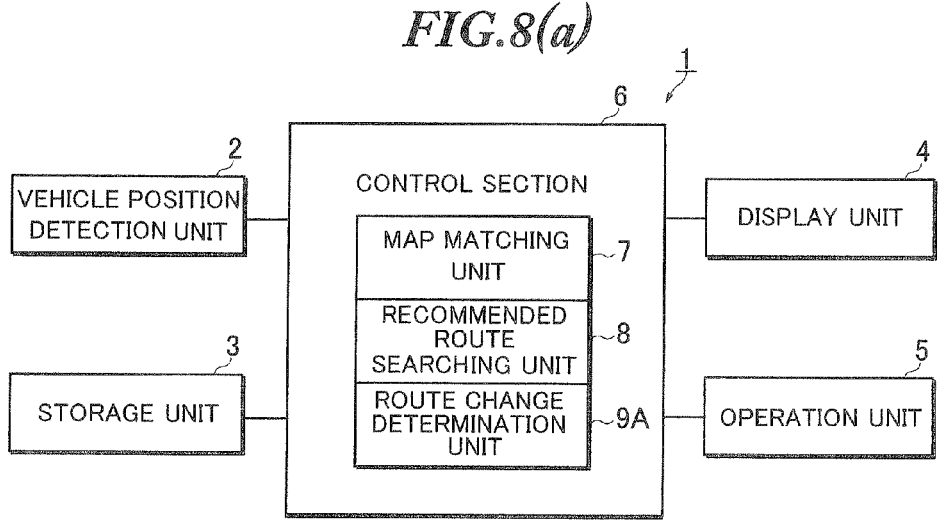
FIG. 8(a) is a block diagram showing the constitution of a navigation device formed according to a second embodiment.
Figure 9:
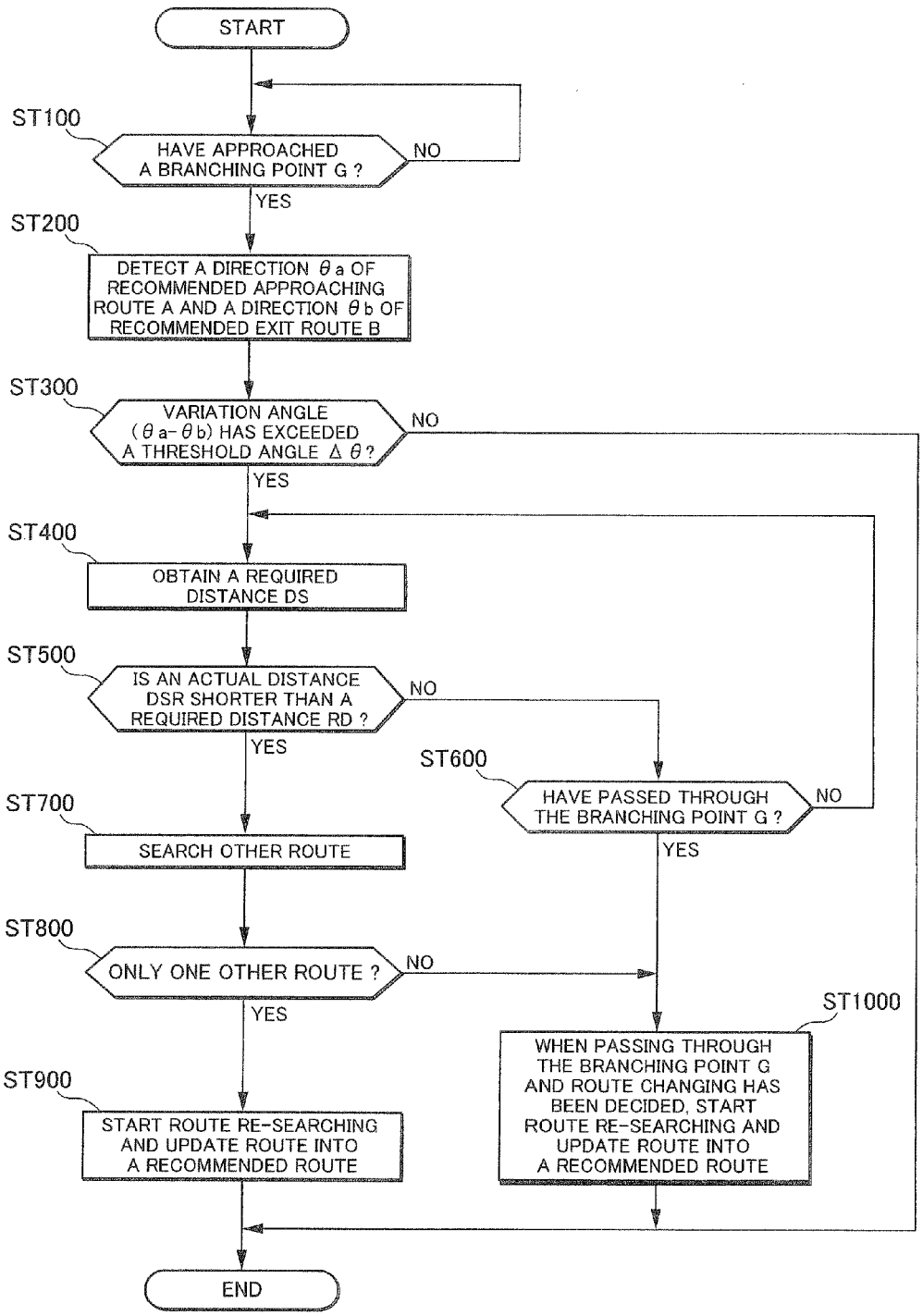
FIG. 9 is a flow chart explaining functions and operations of the navigation device of the second embodiment.
Figure 10:
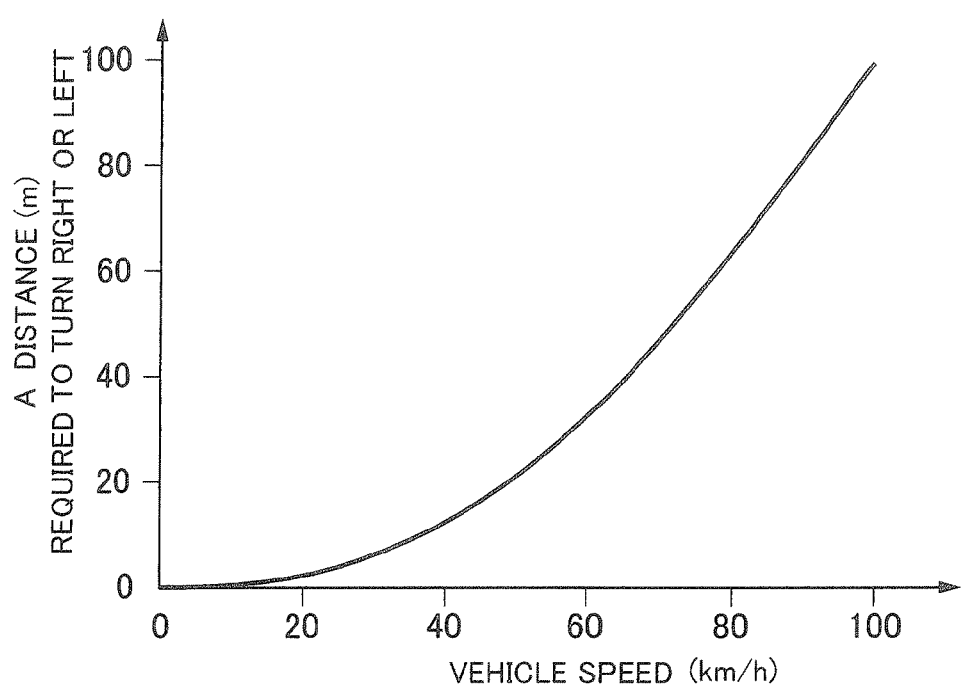
FIG. 10 is an explanatory graph showing the functions of the navigation device of the second embodiment.

Next, a second embodiment will be explained with reference to FIGS. 8 through 10. FIG. 8(a) is a bock diagram showing the constitution of the navigation device 1 of the present embodiment. FIGS. 8(b) through (e) are views briefly explaining the functions of the navigation device 1. FIG. 9 is a flow chart showing the functions and operations of the navigation device 1. FIG. 10 is a graph explaining the functions of the navigation device 1. In FIGS. 8 and 9, portions which are the same as or corresponding to those in FIGS. 2 through 7 are represented by the same reference numerals.

As shown in FIG. 8(a), the navigation device 1 of this embodiment has the same constitution as the above-mentioned preferred embodiment or the first embodiment (refer to FIG. 2(a)), including the vehicle position detection unit 2, storage unit 3, display unit 4, operation unit 5, control unit 6, map matching unit 7, recommended route searching unit 8, and route change determination unit 9A.

The vehicle position detection unit 2, storage unit 3, display unit 4, operation unit 5, control unit 6, map matching process unit 7, and recommended route searching unit 8, have the same functions as the preferred embodiment or the first embodiment. However, the route change determination unit 9A predicts the route change of the vehicle by having different functions from the route change determination unit 9 shown in FIG. 2(a).

Next, description will be given to mainly explain the route change determination unit 9A serving as the featured portion of this embodiment.

At first, description will be given to explain the function of the route change determination unit 9A.

In the navigation devices of the preferred embodiment and the first embodiment, the route change determination unit 9 predicts a deviation of a vehicle from a recommended route (an omen of route changing of the vehicle) based on a turning angle of the vehicle entering the branching area of a branching point.

On the other hand, the route change determination unit 9A of the present embodiment determines a deviation of the vehicle from a recommended route (an omen of route changing) based on a relationship among a recommended approaching route and a recommended exit route both connected to the branching point, the speed of a vehicle entering the branching point, and a distance from the vehicle position to the branching point.

Figure 8B:
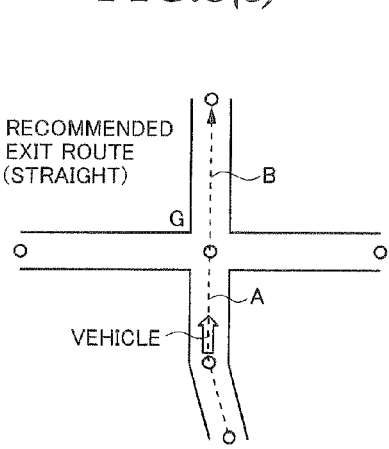
FIGS. 8(b) to 8(f) are explanatory views schematically explaining functions.
Figure 8C:
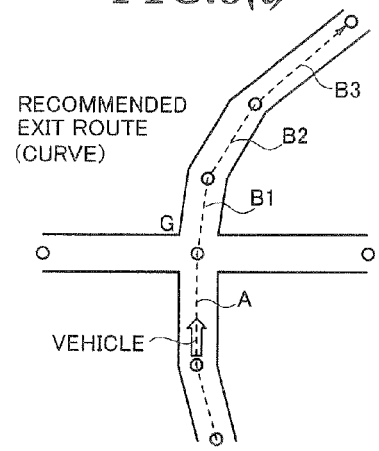
Figure 8D:
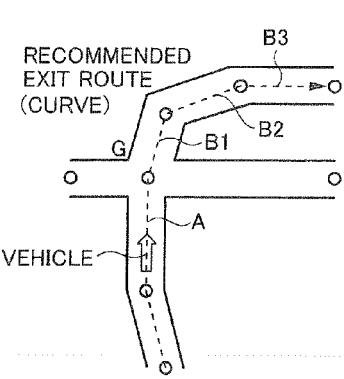

For example, when the direction of the recommended approaching route A and the direction of the recommended exit route B both connected to the branching point G are substantially equal to each other as shown in FIG. 8(b), when the recommended routes B1, B2, and B3 are curves with respect to the recommended approaching route A connected to the branching point G as shown in FIG. 8(c), and when the recommended exit route B is a right or left turning route with respect to the recommended approaching route A connected to the branching point G as shown in FIGS. 8(d) and (e), it is determined whether the vehicle approaching the branching point G is going to change its route based on the relations among the recommended approaching route, the recommended exit route, the velocity of the vehicle approaching the branching point, and the distance from the vehicle position to the branching point.

The functions of the navigation device 1 (mainly the functions of the route change determination unit 9A) will be explained below with reference to a flow chart shown in FIG. 9. Further, reference will also be made to FIGS. 8(b) to (e) during the following description.

As shown in FIG. 9, the data of the recommended route searched by the recommended route searching unit 8, the data of the turning angle θx detected constantly by the vehicle position detection unit 2, and the data of the vehicle position Px generated by the map matching unit 7 are input into the route change determination unit 9. Then, at the step ST100, the route change determination unit 9 compares the vehicle position Px with the recommended route and determines whether the vehicle has approached the branching point G. When the vehicle position Px is within a specified distance from the branching point G, the vehicle is determined to be approaching the branching point G.

When the route change determination unit 9 determines that the vehicle has approached the branching point G, the process proceeds to step ST200, thereby detecting the direction θa of the recommended approaching route A and the direction θb of the recommended exit route both connected to the branching point G, based on the respective links.

At step ST300, the route determination unit 9, taking the direction θb as a reference (0°), compares a specified threshold angle Δθ to a variation angle (θa−θb) which is a direction θa with respect to the direction θb and determines whether the variation angle (θa−θb) is larger than the threshold angle Δθ. Here, the threshold angle Δθ is set to avoid a possibility that the direction of the recommended exit route θb is small with respect to the direction θa of the recommended approaching route. When the directions of the recommended approaching route A and the recommended exit route B are substantially equal to each other as shown in FIG. 8(b) and when the recommended exit routes B1, B2, and B3 are gentle curves with respect to the recommended approaching route A as shown in FIG. 8(c), the threshold angle Δθ is set beforehand to determine that the above-mentioned variation angle (θa−θb) is smaller than the threshold angle Δθ.

In particular, for example, by setting the threshold angle Δθ at about 45°, when the variation angle (θa−θb) is smaller than the threshold angle Δθ, it is possible to determine that the recommended exit route B is substantially the same or only gently curved with respect to the recommended approaching route A.

Then, at step ST300, when it is determined that the variation angle (θa−θb) has exceeded the threshold angle Δθ ("Yes"), the process proceeds to step ST400. When it is determined that the angle (θa−θb) is not larger than the threshold angle Δθ ("No"), the process returns back to step ST100 and starts all over again.

Next, at step ST400, the route change determination unit 9 finds, from the distance conversion data stored in the storage unit 3, a distance DS required to travel to the recommended exit route through the branching point G (thereafter, referred to as "required distance"), based on the vehicle speed Vx provided by the vehicle position detection unit 2.

Figure 8E:
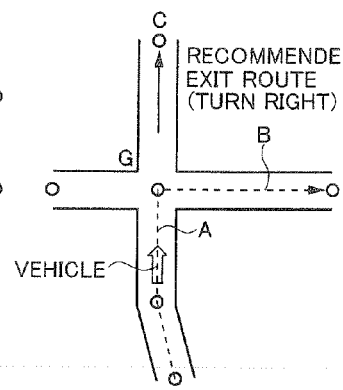
Figure 8F:
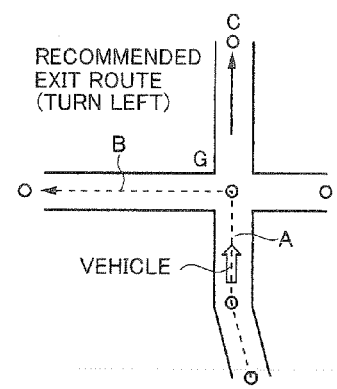

As shown in FIGS. 8(e) and (f), when the recommended exit route B connected to the branching point G is a route to turn to the right or left of the recommended approaching route A, a higher speed of the vehicle traveling on the recommended approaching route A will cause a longer necessary distance DS from the vehicle position Px to the branching point G, because of a necessity to reduce the vehicle speed or the like.

Then, the distance conversion data indicating a relationship (shown in FIG. 10) between the vehicle speed and the required distance for the vehicle to turn right or left, is searched from the storage unit 5 based on the vehicle speed Vx, thereby obtaining the distance DS required for the vehicle speed Vx.

FIG. 10 shows an example in which the recommended exit route B turns about 90° to the right or left of the recommended approaching route A. The storage unit 3 also stores the distance conversion data indicating a distance required to turn right or left other than 90° with respect to the vehicle speed Vx. When the angle of the recommended exit route B with respect to the recommended approaching route A is other than 90°, searching is performed to find the distance conversion data not involving 90°, thereby obtaining the distance DS required for the vehicle speed Vx.

Next, at step ST500, the route change determination unit 9 calculates an actual distance DSR from the vehicle position Px to the branching point G, based on the vehicle position Px provided by the map matching unit 7 and the node data (coordinate information) of the branching point G. Then, the route change determination unit 9 compares the actual distance DSR with the above-mentioned required distance DS, thereby determining whether the distance DSR is shorter than the required distance DS. If the actual distance DSR is shorter than the required distance DS, the process proceeds to step ST700. On the other hand, if the actual distance DSR is longer than the required distance DS, the process proceeds to step ST600 and then returns back to step ST400 to repeat the previous steps until the vehicle passes through the branching point G.

Namely, the route change determination unit 9 determines at step ST500 whether the actual distance DSR is shorter than the required distance DS, thereby performing an equivalent process equal to a process of determining whether the vehicle is traveling at a speed not able to turn right or left at the branching point G.

Next, at step ST700, the route change determination unit 9 searches the road data stored in the storage unit 3 for other route connected to the branching point G, excluding the recommended exit route B and the routes on which the vehicle cannot turn right or left when traveling at the vehicle speed Vx. Then, the process proceeds to step ST800.

At step ST800, the route change determination unit 9 investigates whether the searched other routes are only one. If other routes are only one ("Yes"), the process proceeds to step ST900. If other routes are several or none "No", the process proceeds to step ST1000.

Next, at step ST900, the recommended route searching unit 8 starts the route re-searching to find a new recommended route to guide the vehicle to the destination through the above-mentioned single other route. Further, the control unit 6 compares the vehicle position Px to the node of the branching point G and determines whether the vehicle has passed through the branching point G and the route changing has been decided. If it is determined that the route changing has been decided, the display unit 4 will be caused to update and display the new recommended route searched by the recommended route searching unit 8. Subsequently, the process returns back to step ST100 again to repeat the previous steps.

Next, once the process shifts from the above-mentioned step ST600 or step ST800 to step ST1000, the control unit 6 determines at step ST1000 whether the vehicle has passed through the branching point G and the route changing has been decided. If the route changing has been decided, the recommended route searching unit 8 is caused to start a route re-searching. Namely, what is required is not of predicting a vehicle route deviation from a recommended route (an omen of route changing) and then performing a route re-searching, but re-searching a new recommended route going through other route at the time the route changing is decided. Then, the new recommended route is updated and displayed in the display unit 4, and the process returns back to step ST100 again to repeat the previous steps.

As described above, according to the navigation device 1 of the present embodiment, an actual distance DSR from the vehicle position Px to the branching point G is compared to a required distance DC up to the branching point G which is necessary for the vehicle to travel through the recommended exit route B on which the vehicle enters the branching point G from the recommended approaching route A and turns right or left at the speed Vx. If the actual distance DSR is shorter than the required distance DS, it is determined that the vehicle will not travel through the recommended route B on which the vehicle turns right or left, thereby rendering it possible to start a route re-searching at an earliest time.

If an actual distance DSR is shorter than the required distance DS, it is determined that the vehicle will change its route to other route which allow it to travel at the present speed Vx (for example, a straight route C shown in FIGS. 8(*e*) and (*f*)) or other route on which the vehicle can travel along a gentle curve, thereby making it possible to start a route re-searching at an earliest time based on those other routes.

The invention claimed is:

1. A navigation device formed such that when guiding a vehicle by virtue of a recommended approaching route and a recommended exit route both connected to a branching point, and once the vehicle traveling from the recommended approaching route and heading for the branching point is about to deviate from the recommended exit route, said navigation device starts a route re-searching for finding a new recommended route going through other route, wherein said navigation device comprises route change determination device for detecting that a turning angle of the vehicle is about to be in a direction within an angle range not including an angle formed between the direction of the recommended approaching route and the direction of the recommended exit route, thereby starting the route re-searching.

2. A navigation device formed such that when guiding a vehicle by virtue of a recommended approaching route and a recommended exit route both connected to a branching point, and once the vehicle traveling from the recommended approaching route and heading for the branching point is about to deviate from the recommended exit route, said navigation device starts a route re-searching for finding a new recommended route going through other route, wherein said navigation device comprises route change determination device for detecting that a turning angle of the vehicle is within an angle range not including a predetermined threshold angle range having the direction of the recommended approaching route as a reference, is about to be in a direction exceeding a direction of the recommended exit route from a direction of the recommended approaching route, or a direction opposite to the direction of the recommended exit route, thereby starting the route re-searching.

3. The navigation device according to claim 1 or claim 2, wherein the route change determination device detects another route existing in an angle range developing from a turning angle of the vehicle to an angle of 180° opposite to the direction of the recommended approaching route, and starts the route re-searching to find a new recommended route going through said another route.

4. The navigation device according to the claim 3, wherein the route change determination device starts the route re-searching when the detected other route is only one.

5. A navigation method constituted such that when guiding a vehicle by virtue of a recommended approaching route and a recommended exit route both connected to a branching point, and once the vehicle traveling from the recommended approaching route and heading for the branching point is about to deviate from the recommended exit route, said navigation method starts a route re-searching for finding a new recommended route going through other route, wherein said navigation method comprises a route change determination step for detecting that a turning angle of the vehicle is about to be in a direction within an angle range not including an angle formed between the direction of the recommended approaching route and the direction of the recommended exit route, thereby starting the route re-searching.

6. A navigation method constituted such that when guiding a vehicle by virtue of a recommended approaching route and a recommended exit route both connected to a branching point, and once the vehicle traveling from the recommended approaching route and heading for the branching point is about to deviate from the recommended exit route, said navigation method starts a route re-searching for finding a new recommended route going through other route, wherein said navigation method comprises a route change determination step for detecting that a turning angle of the vehicle is within an angle range not including a predetermined threshold angle range having the direction of the recommended approaching route as a reference, is about to be in a direction exceeding a direction of the recommended exit route from a direction of the recommended approaching route, or a direction opposite to the direction of the recommended exit route, thereby starting the route re-searching.

* * * * *